(12) United States Patent
Yamashita et al.

(10) Patent No.: US 7,759,833 B2
(45) Date of Patent: Jul. 20, 2010

(54) PERMANENT MAGNET ROTATOR AND MOTOR USING THE SAME

(75) Inventors: Fumitoshi Yamashita, Nara (JP);
Hiroshi Murakami, Osaka (JP);
Yukihiro Okada, Osaka (JP); Kiyomi Kawamura, Osaka (JP)

(73) Assignee: Panasonic Corporation, Osaka (JP)

( * ) Notice: Subject to any disclaimer, the term of this patent is extended or adjusted under 35 U.S.C. 154(b) by 226 days.

(21) Appl. No.: 12/162,435

(22) PCT Filed: Nov. 21, 2007

(86) PCT No.: PCT/JP2007/072500

§ 371 (c)(1),
(2), (4) Date: Jul. 28, 2008

(87) PCT Pub. No.: WO2008/065938

PCT Pub. Date: Jun. 5, 2008

(65) Prior Publication Data

US 2009/0021097 A1    Jan. 22, 2009

(30) Foreign Application Priority Data

Nov. 27, 2006    (JP) .............................. 2006-318255

(51) Int. Cl.
*H02K 1/27* (2006.01)
*H02K 1/22* (2006.01)
(52) U.S. Cl. ................ 310/156.28; 310/44; 310/156.43
(58) Field of Classification Search .................. 310/44, 310/156.28, 156.43
See application file for complete search history.

(56) References Cited

U.S. PATENT DOCUMENTS

| 2002/0180294 A1 | 12/2002 | Kaneda et al. |
| 2007/0228845 A1* | 10/2007 | Yamashita ................... 310/46 |
| 2009/0007417 A1* | 1/2009 | Yamashita et al. ............ 29/608 |

FOREIGN PATENT DOCUMENTS

| JP | 2002-354721 | 12/2002 |
| JP | 2005-224021 | 8/2005 |
| JP | 2006-211802 | 8/2006 |

OTHER PUBLICATIONS

Z.Q.Zhu et al. "Powder Alignment System for Anisotropic Bonded NdFeB Halbach Cylinders" IEEE Transactions on Magnetics, vol. 36, No. 5, Sep. 2000.*
International Search Report issued Feb. 26, 2008 in the International (PCT) Application of which the present application is the U.S. National Stage.
J. Schulze, "Application of High Performance Magnets in Small Motors," 18th Workshop on High Performance Magnets and Their Applications, Annecy (France) 2004, pp. 908-915.

(Continued)

*Primary Examiner*—Burton Mullins
(74) *Attorney, Agent, or Firm*—Wenderoth, Lind & Ponack, L.L.P.

(57) ABSTRACT

A motor generally has a contradictory relation between decrease of cogging torque and increase of torque density. To overcome this problem, continuous direction control is provided for anisotropy with modification of magnetic poles so that the average absolute value of differences between $M\theta$ and $90 \times \sin[\phi\{2\pi/(360/p)\}]$ is set to be 3° or less, where $M\theta$ is a direction of anisotropy with respect to a radial tangent line of a magnetic pole plane, $\phi$ is a mechanical angle, and p is the number of pole pairs.

18 Claims, 12 Drawing Sheets

OTHER PUBLICATIONS

Y. Pang et al., "Comparison of Brushless Motors Having Halbach Magnetized Magnets and Shaped Parallel Magnetized Magnets," 18$^{th}$ Workshop on High Performance Magnets and Their Applications, Annecy (France) 2004, pp. 400-407.

W. Rodewald et al., "Properties and Applications of High Performance Magnets," 18$^{th}$ Workshop on High Performance Magnets and Their Applications, Annecy (France) 2004, pp. 52-63.

A. Matsuoka et al., "Examination of Performance Improvement Brushless DC Fan Motors," the Institute of Electrical Engineers of Japan, Motor Study Group, RM-01-161, 2001, pp. 13-18 (English Abstract).

D. Howe et al., "Application of Halbach Cylinders to Electrical Machines," 16$^{th}$ International Workshop on Rare-Earch Magnets and Their Applications, (Japan) 2000, pp. 903-922.

R. W. Lee et al., "Processing of Neodymium-Iron-Boron Melt-Spun Ribbons to Fully Dense Magnets," IEEE Transactions on Magnets, vol. Mag-21, No. 5, Sep. 1985, pp. 1958-1963.

T. Iriyama, "Development Trends of High-Performance Rare-Earth Bonded Magnets," MEXT Innovation Creation Projects/Symposium on Efficient use of Rare-Earth Resources and Advanced Materials, 2002, pp. 19-26 (and English translation of Abstract).

B. H. Rabin et al., "Recent Developments in NdFeB Powder," 120$^{th}$ Topical Symposium of the Magnetic Society of Japan, 2001, pp. 23-28.

Dr. Bao-Min Ma, "Recent Powder Development at Magnequench," Polymer Bonded Magnets, Apr. 2002, pp. 1-38.

S. Hirosawa et al., "Structure and Magnetic Properties of $Nd_2Fe_{14}B/Fe_xB$-type Nanocomposites Prepared by Strip Casting," 9th Joint MMM/INTERMAG, FG-05, 2004 pp. 1-3.

H. A. Davies et al., "Nanophase Pr. and Nd/Pr-Based Rare Earth-Iron-Boron Alloys," 16$^{th}$ Workshop on Rare Earth Magnets and Their Applications, 2000, pp. 485-494.

N. Takahashi et al., "Investigation of Simulated Annealing Method and its Application to Optimal Design of Die Mold for Orientation of Magnetic Powder," IEEE Transactions on Magnetics, Vol. 32, No. 3, May 1996, pp. 1210-1213.

A. Kawamoto et al., "$Sm_2Fe_{17}N_3$ Magnet Powder Made by Reduction and Diffusion Method," IEEE Trans. on Magnetics, vol. 35, No. 5, Sep. 1999, pp. 3322-3324.

T. Takeshita et al., "Magnetic Properties and Micro structures of the NdFeB Magnet Powder Produced by Hydrogen Treatment," 10$^{th}$ Workshop on Rare-Earth Magnets and Their Applications, 1989, pp. 551-557.

F. Yamashita et al., "Radially-Anisotropic Rare-Earth Hybrid Magnet with Self-Organizing Binder Consolidated Under a Heat and a Low-Pressure Configuration," 18$^{th}$ Workshop on High Performance Magnets and Their Applications, Annecy (France) 2004, pp. 76-83.

* cited by examiner

PERMANENT MAGNET ROTATOR AND MOTOR USING THE SAME

TECHNICAL FIELD

The present invention relates to a permanent magnet rotator which is capable of providing continuous direction control for anisotropy with modification of a magnetic pole so that direction $M\theta$ of anisotropy with respect to a mechanical angle $\phi$ can have a distribution of $90 \times \sin[(\{2\pi/(360/p)\}]$. More particularly, the present invention relates to a permanent magnet rotator which is capable of providing continuous direction control for anisotropy for the purpose of reduction of power consumption, savings in resources, miniaturization and quiescence of permanent magnet type motors having their power capacity of less than about 50 W which are being widely used as various kinds of driving sources for home appliances, air conditioners, information devices, etc, and a motor using the same.

BACKGROUND ART

A motor may be referred to as a multi-function part for changing electric energy to mechanical energy by a combination of a shaft, a bearing, a stator, etc. made by high-precision machining of various of kinds of materials such as steel, nonferrous metal, polymer and the like. In recent years, a so-call permanent magnet type motor has been put in the mainstream, which uses a magnet having the ability to attract or repel other magnetic materials and the ability to permanently generate a static magnetic field without using external energy. A physical difference of the magnet from other magnetic material is that, for the magnet, effective magnetization M is left even after removal of an external magnetic field, and magnetization inversion (demagnetization) is initially induced under application of heat or a relatively large reversal magnetic field, therefore magnetization M is decreased. Energy Density (BH) max is one of important characteristic values of such a magnet. This means magnet's latent energy per unit volume.

The magnet's strong attractive and repulsive ability does not necessarily give high performance to the magnet depending on the kind of magnet. For example, it is disclosed in Non-Patent Document 1 that increase of energy density (BH) max of a magnet leads to increase of torque density in a radial airgap type motor, which is a subject matter of the present invention, from a relationship between residual magnetic flux density Br, which is one of basic characteristics of the magnet, and a motor constant KJ (KJ being a ratio of power torque KT to square root of Ohmic loss $\sqrt{R}$), which is an indicator of motor performance, with motor diameter, rotator diameter, giagap, soft magnetic material, magnet dimension and the like fixed.

However, while the increase of energy density (BH) max of the magnet leads to the increase of torque density in the motor, which is the subject matter of the present invention, since a rotator iron core of the motor has slots in which a coil is accommodated, and teeth forming a part of a magnetic circuit, a permeance is varied with rotation of the motor. Accordingly, the increase of energy density (BH) max of the magnet leads to increase of torque pulsation, i.e., cogging torque. The increase of cogging torque disturbs smooth rotation of the motor, which results in increase of vibration and noise of the motor, thereby causing a bad effect such as deterioration of rotation controllability.

To avoid such a bad effect, many studies for reduction of cogging torque have conventionally been made to approach an airgap magnetic flux density distribution between a rotator and a stator iron core of a motor to a sinusoidal wave-shaped distribution.

First, regarding magnetic poles having a certain thickness in a magnetization direction, thickness-deviation of a magnet will be described. For example, as shown in FIG. 11A of Non-Patent Document 2, when a motor has 12 magnetic poles/18 slots, with the magnetic poles having thickness-deviation with residual magnetization Br=1.2 T, the maximum thickness of 3 mm in their center, the minimum thickness of 1.5 mm in their both ends, cogging torque of the motor can be minimized. The motor shown in FIG. 11A of this document includes magnetic poles 1 having thickness-deviation, stator iron core 2, stator iron core slots 3 and stator iron core teeth 4. Although magnetic poles 1 are segmented in a side of their outer diameter in this example, it is noted that magnetic poles 1 may be segmented from the reverse side, that is, from the side of their inner diameter for reduction of cogging torque.

In addition, as shown in FIG. 11A of Non-Patent Document 2, it is required to be the magnetic poles having such thickness-deviation that the maximum thickness in their center is equal to about ½ of the minimum thickness in their both ends in order to minimize cogging torque. Thus, when the thickness of magnetic poles 1, that is, direction (thickness) of magnetization M, becomes small, it is difficult to sufficiently reduce cogging torque through the thickness-deviation of magnetic poles 1. Moreover, in general, it is difficult to treat the magnetic poles because of their fragile mechanical property.

In the meantime, with regard to magnetic poles having small thickness in a magnetization direction, there has been known a method of skewing magnetic poles as shown in FIG. 11B of Non-Patent Document 3 or a method of continuously deleting a magnetic pole area between magnetic poles as shown in FIG. 11C of Non-Patent Document 4.

Summarizing the above conventional techniques, magnetic pole ends of thick magnetic poles are thinned to ½ of their original thickness to widen an airgap between the magnetic poles and a stator iron core or reduce a magnetic pole area between thin magnetic poles. Thus, the amount of static magnetic field Ms generated from the magnetic poles and flowing into the stator iron core as a magnetic flux $\phi$ is suppressed. As a result, the above-mentioned methods typically lower torque density by 10 to 15% due to the reduction of cogging torque. Accordingly, the cogging torque reduction method in the conventional techniques shown in FIGS. 11A, 11B and 11C is in contradiction to the method of increasing torque density of a motor with increase of energy density (BH) max of a magnet.

On the other hand, D. Howe et al. has reported a motor cogging torque reduction method as a method of using a $Nd_2Fe_{14}B$-based rare-earth sintered magnet having small thickness of 1.2 mm in a magnetization direction and having high energy density with residual magnetization Mr of 1 T so that the thickness in the magnetization direction or the magnetic pole area as shown in FIGS. 11A, 11B and 11C may not be reduced. In this report, a so-called Halbach Cylinder has been proposed in which each of magnetic poles segmented into 2 to 5 pieces and magnetization direction (direction of magnetic anisotropy) of each of the pieces is adjusted step by step as shown in FIGS. 12A to 12D. In FIGS. 12A to 12D, subscripts (2) to (5) of magnetic poles 1 designate the number (2 to 5) of pieces of each of magnetic poles 1. An arrow in each of the pieces indicates direction of magnetization vector M along an oriented magnetization easy axis (C axis), that is, direction of anisotropy.

FIG. 13 shows a relationship between the number of magnetic pole pieces of segmented magnetic poles and a cogging torque for a motor having 12 poles/18 slots using the above-configured magnetic poles. It can be seen from the figure that the number (N) of magnetic pole pieces of segmented magnetic poles and the cogging torque (Tcog) have a relationship of exponential approximation of Tcog.=61.753 exp(−0.1451N). In addition, FIG. 13 implies that it is ideal that magnetization vector (M) for any mechanical angle ($\phi$), and M$\theta$/$\phi$p (M$\theta$ is an angle with respect to a circumferential tangent line of magnetic poles are continuously varied minutely in, particularly, a specified direction between different magnetic poles. However, for the $Nd_2Fe_{14}B$-based rare-earth sintered magnet having the thickness of 1.2 mm and the high energy density with residual magnetization (Mr) of 1 T, it is difficult to regularly and minutely arrange magnetic pole pieces having different directions of anisotropy and configure the magnetic poles with high dimensional precision. Thus, it is very difficult to manufacture a multi-pole rotor provided with an integral multiple of magnetic poles or a radial airgap type magnet motor using the multi-pole rotor. In addition, it may be guessed without difficulty that motors employing the above-mentioned Halbach Cylinder are uneconomical.

An object of the present invention is to provide a permanent magnet rotor without reduction of a magnetic pole volume or area and with additional reduction of cogging torque for anisotropic magnetic poles having a shape difficult to be segmented to, for example, small thickness of 1.5 mm, and high energy density.

The gist of the present invention lies in a permanent magnet rotor which is capable of providing continuous direction control for anisotropy with modification of magnetic poles so that the average absolute value of differences between M$\theta$ and 90×sin [$\phi\{2\pi/(360/p)\}$] (where M$\theta$ is a direction of anisotropy with respect to a radial tangent line of a magnetic pole plane, $\phi$ is a mechanical angle, and p is the number of pole pairs) is set to be 3° or less. That is, the gist of the present invention lies in a permanent magnet rotor with the direction (M$\theta$) of anisotropy distributed in a range of 0 to 90° with respect to the mechanical angle ($\phi$) as a sinusoidal wave-shaped distribution. Permanent magnet rotors with such continuous direction control for anisotropy have not been yet known in the art.

The permanent magnet rotor related to the present invention has magnetic poles modified to provide continuous direction control for anisotropy. More particularly, assuming that an angle between a uniform oriented magnetic field (Hex) and a radial tangent line of inner and outer circumferences of magnetic poles is H$\theta$, a circumference length at an airgap side of magnetic poles before modified is Lo, and a circumference length at an airgap side of magnetic poles after modified is L, the magnetic poles are modified in the radial direction with a specified range of Lo/L=1.06 to 1.14. For the modification, first, a relationship of H$\theta$≈M$\theta$ is set in circumferential magnetic pole ends and a circumferential magnetic pole center. Subsequently, in portions except the circumferential magnetic pole ends and the circumferential magnetic pole center, continuous direction control is provided for anisotropy by means of action of shear stress ($\tau$) toward the circumferential center at the air gap side of magnetic poles.

The permanent magnet rotor related to the present invention has a high-precise relationship of M$\theta$ and 90×sin [$\phi\{2\pi/(360/p)\}$] for magnetic anisotropic magnetic poles, so that reduction of cogging torque and increase of torque density, which are contradict from each other, can be compatible.

In particular, the magnetic poles of the permanent magnet rotor have a macro structure in which $Nd_2Fe_{14}B$-based rare-earth magnet particles having energy density (BH) max$\geq$150 kJ/m$^3$ and size of less than 150 μm are isolated from each other in a matrix (continuous phase) including $Sm_2Fe_{17}N_3$-based rare-earth magnet powders having average particle diameter of 3 to 5 μm and a coupling agent, with a volume fraction of magnetic material having energy density (BH) max$\geq$270 kJ/m$^3$ in magnetic anisotropic magnetic poles set to be more than 80 vol. %, with a magnetizing field (Hm) set in parallel to an oriented magnetic field (Hex), and with the magnetizing field (Hm) set to be more than 2.4 MA/m.

A magnetically-isotropic magnet can be freely magnetized in any directions depending on a direction of a magnetizing field and a strength distribution of the magnetizing field. Thus, a magnetization pattern as indicated by arc-like arrows of magnetic poles 1 in FIG. 14 can be obtained by a shape of a magnetizing yoke and optimization of a magnetomotive force. This allows an airgap magnetic flux density distribution between the magnetic poles and a stator iron core to be easily adjusted to a sinusoidal wave shape. Thus, it is very ease to reduce cogging torque of the motor as compared when thin magnetic poles are made of magnetically-anisotropic magnetic material.

It is believed that the research on the above-mentioned isotropic rare-earth magnetic material originates from R. W. Lee et al. suggested that an isotropic $Nd_2Fe_{14}B$-based bonded magnet having energy density (BH) max=72 kJ/m$^3$ is obtained when a rapid-solidified ribbon having energy density (BH) max=111 kJ/m$^3$ is fixed with a resin (see Non-Patent Document 6).

Since then, from the late 1980's to the present, studies on isotropic rare-earth magnetic materials with rapid-solidification of rare earth-iron molten alloy have been actively made. For example, in addition to isotropic magnetic materials with various micro-controlled alloy structures including nano composite magnetic materials using exchange coupling based on micro-structures of $Nd_2Fe_{14}B$ family, $Sm_2Fe_{17}N_3$ family, or exchange coupling based on micro-structures of these families and $\alpha$Fe, FeB and $Fe_3B$ families, other isotropic magnetic materials having different shapes of powder have been available in the industries (For example, see Non-Patent Documents 7 to 10).

In addition, H. A. Davis et al. have reported isotropic magnetic materials having energy density (BH) max of 220 kJ/m$^3$ (see Non-Patent Document 11). However, the energy density (BH) max of isotropic magnetic materials available in the industries is no more than 134 kJ/m$^3$, and the energy density (BH) max of general $Nd_2Fe_{14}B$ bonded magnets applied to small motors having power capacity of 50 W or less is about 80 kJ/m$^3$ or less. In other words, since R. W. Lee et al. have made at 1985 the isotropic $Nd_2Fe_{14}B$-based bonded magnet having energy density (BH) max=72 kJ/m$^3$ using the ribbon having energy density (BH) max=111 kJ/m$^3$, the amount of increase in energy density (BH) max is below 10 kJ/m$^3$ even at the present after the elapse of more than 20 years. Accordingly, it can not be anticipated when sufficient high motor torque density by a permanent magnet rotor, which is the subject matter of the present invention, can be achieved with increase of energy density along the advance of isotropic magnetic materials.

On the other hand, since change from an isotropic magnet to an anisotropic magnet is typically followed by increase of energy density (BH) max, a motor equipped with a permanent magnet rotor, which is the subject matter of the present invention, has higher torque density while increasing in cogging torque.

In addition, N. Takahashi et al. have proposed a method of controlling a direction of anisotropy by rearranging a magnetic material in a nonmagnetic forming mold and changing a magnetic flux (φ) of a cavity portion from a fixed direction to any different directions in manufacturing an arc-like anisotropic magnet used for a motor (see Non-Patent Document 12).

However, it is difficult to finely control the direction of magnetic flux (φ) of the cavity portion. Thus, it is difficult to provide precise continuous direction control for anisotropy so that the average absolute value of differences between Mθ and 90×sin [φ{2π/(360/p)}] (where Mθ is a direction of anisotropy with respect to a radial tangent line of a magnetic pole plane, φ is a mechanical angle, and p is the number of pole pairs) is set to be 3° or less, as in the present invention.

As described above, although the conventional techniques increase torque density of a motor with increase of energy density (BH) max, these techniques have the problem of deterioration of quiescence and controllability with increase of cogging torque.

[Non-Patent Document 1] J. Schulze: "Application of high performance magnets for small motors", Proc. of the 18$^{th}$ international workshop on high performance magnets and their applications, pp. 908-915, 2004

[Non-Patent Document 2] Y. Pang, Z. Q. Zhu, S. Ruangsinchaiwanich, D. Howe: "Comparison of brushless motors having halbach magnetized magnets and shaped parallel magnetized magnets", Proc. of the 18$^{th}$ international workshop on high performance magnets and their applications, pp. 400-407, 2004

[Non-Patent Document 3] W. Rodewald, W. Rodewald, M. Katter: "Properties and applications of high performance magnets", Proc. of the 18$^{th}$ international workshop on high performance magnets and their applications, pp. 52-63, 2004

[Non-Patent Document 4] Atsushi Matsuoka, Touko Yamazaki, Hitoshi Kawaguchi: "Review on high performance of brushless DC motors for use in air blower", The Institute of Electrical Engineers of Japan, Motor Study group, RM-01-161, 2001

[Non-Patent Document 5] D. Howe, Z. Q. zhu: "Application of halbach cylinders to electrical machine", Proc. of the 17$^{th}$ int. workshop on rare earth magnets and their applications, pp. 903-922, 2000

[Non-Patent Document 6] R. W. Lee, E. G. Brewer, N. A. Schaffel: "Processing of Neodymium-Iron-Boron Melt-Spun Ribbons to Fully Dense Magnets", IEEE Trans. Magn., Vol. 21, pp. 1958, 1985

[Non-Patent Document 7] Yasuhiko Iriyama: "Trend of development of high performance rare-earth bonded magnets", MEXT Innovation Creation Projects/Symposium on efficient use of rare-earth resources and advanced materials, pp. 19-26, 2002

[Non-Patent Document 8] B. H. Rabin, B. M. Ma: "Recent developments in Nd—Fe—B powder", 120$^{th}$ Topical Symposium of the Magnetic Society of Japan, pp. 23-28, 2001

[Non-Patent Document 9] B. M. Ma: "Recent powder development at magnequench", Polymer Bonded Magnets 2002, 2002

[Non-Patent Document 10] S. Hirasawa, H. Kanekiyo, T. Miyoshi, K. Murakami, Y. Shigemoto, T. Nishiuchi: "Structure and magnetic properties of $Nd_2Fe_{14}B/Fe_xB$-type nanocomposite permanent magnets prepared by strip casting", 9$^{th}$ Joint MMM/INTERMAG, FG-05, 2004

[Non-Patent Document 11] H. A. Davies, J. I. Betancourt, C. L. Harland: "Nanophase Pr and Nd/Pr based rare-earth-iron-boron alloys", Proc. of 16$^{th}$ Int. Workshop on Rare Earth Magnets and Their Applications, pp. 485-495, 2000

[Non-Patent Document 12] N. Takahashi, K. Ebihara, K. Yoshida, T. Nakada, K. Ohashi and K. Miyata: "Investigation of simulated annealing method and its application to optimal design of die mold for orientation of magnetic powder", IEEE Trans. Mag., Vol. 32, No. 3, pp. 1210-1213, 1996

[Non-Patent Document 13] A. Kawamoto, T. Ishikawa, S. Yasuda, K. Takeya, K. Ishizaka, T. Iseki, K. Ohmori: "SmFeN magnet powder prepared by reduction and diffusion method", IEEE Trans. Magn., 35, pp. 3322, 1999

[Non-Patent Document 14] T. Takeshita, R. Nakayama: "Magnetic properties and micro-structure of the Nd—Fe—B magnet powders produced by hydrogen treatment", Proc. 10$^{th}$ Int. Workshop on Rare-earth Magnets and Their Applications, pp. 551-562, 1989

[Non-Patent Document 15] F. Yamashita, H. Fukunaga: "Radially-anisotropic rare-earth hybrid magnet with self-organizing binder consolidated under a heat and a low-pressure configuration", Proc. 18$^{th}$ Int. Workshop on High Performance Magnets and Their Applications, Annecy, pp. 76-83, 2004

DISCLOSURE OF THE INVENTION

The present invention provides a continuous direction control for anisotropy with modification of magnetic poles so that direction (Mθ) of anisotropy with respect to a mechanical angle (θ) can have a distribution of 90×sin [φ{2π/(360/p)}], thereby increasing torque density without increasing cogging torque of a motor, irrespective of anisotropic magnetic poles which has energy density about two times as high as energy density of isotropic magnet sinusoidally-magnetized with the energy density (BH) max≧80 kJ/m$^3$.

Accordingly, the present invention is useful for reduction of power consumption, savings in resources, miniaturization and quiescence of permanent magnet type motors having their power capacity of less than about 50 W which are being widely used as various kinds of driving sources for home appliances, air conditioners, information devices, etc.

DESCRIPTION OF REFERENCE NUMERALS AND SIGNS

1: MAGNETIC POLE
2: STATOR IRON CORE
3: STATOR IRON CORE SLOT
4: STATOR IRON CORE TEETH
51, 52: MAGNETIC POLE
53: 8-POLE PERMANENT MAGNET ROTATOR
54: 8 POLES/12 SLOTS PERMANENT MAGNET TYPE MOTOR
φ: MECHANICAL ANGLE
M: MAGNETIZATION VECTOR
Mθ: ANGLE OF MAGNETIZATION VECTOR
Hex: UNIFORM ORIENTED MAGNETIC FIELD
Hθ: ANGLE OF EXTERNAL MAGNETIC FIELD
p: NUMBER OF POLE PAIRS

PREFERRED EMBODIMENTS FOR CARRYING OUT THE INVENTION

The present invention provides a permanent magnet rotator which is capable of providing continuous direction control for anisotropy with precision so that energy density (BH) max, which has been insufficient in an isotropic magnet, is more than doubled, and average absolute value of differences between Mθ and 90×sin [φ{2π/(360/p)}] (where Mθ is a direction of anisotropy with respect to a radial tangent line of a magnetic pole plane, φ is a mechanical angle, and p is the number of pole pairs) is set to be 3° or less. This allows increase of torque density of a motor while reducing cogging torque of the motor even for an anisotropic magnet having the same shape.

The gist of the present invention lies in a permanent magnet rotator which is capable of providing continuous direction control for anisotropy with precision so that the average absolute value of differences between Mθ and 90×sin [φ{2π/(360/p)}] (where Mθ is a direction of anisotropy with respect to a radial tangent line of a magnetic pole plane, φ is a mechanical angle, and p is the number of pole pairs) is set to be 3° or less. That is, the gist of the present invention lies in a permanent magnet rotator with the direction (Mθ) of anisotropy distributed in a range of 0 to 90° with respect to the mechanical angle (φ) as a sinusoidal wave-shaped distribution. Permanent magnet rotators with such continuous direction control for anisotropy have been yet not known in the art.

Figure 1A:
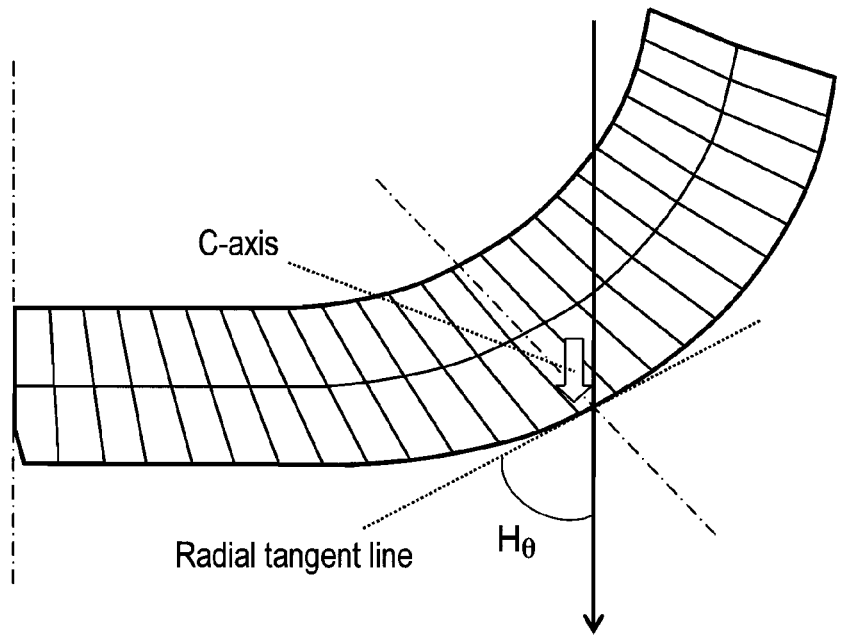
FIG. 1A is a first conceptual view showing an anisotropy direction control by modification.
Figure 1B:
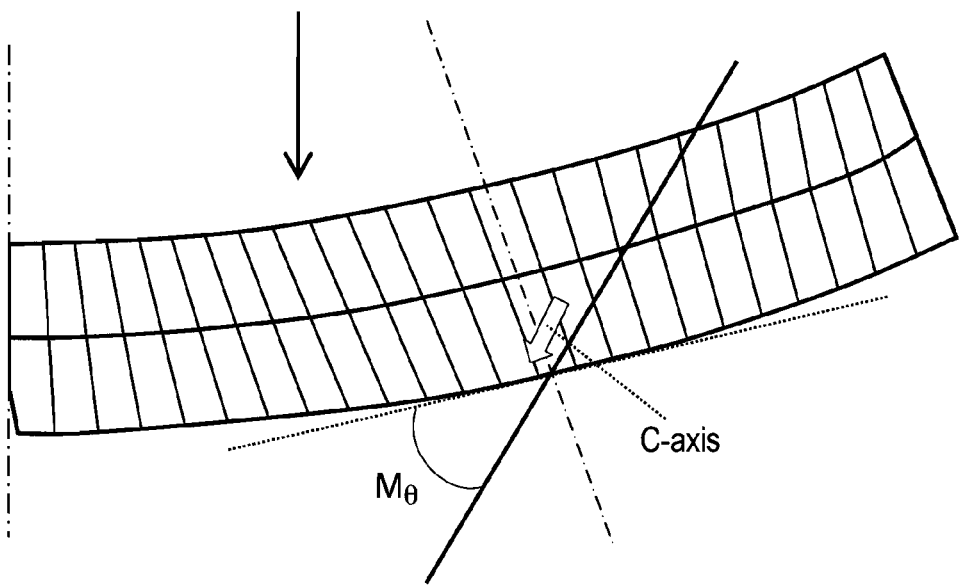
FIG. 1B is a second conceptual view showing an anisotropy direction control by modification.

To attain the above-configured magnetic poles, first, magnetic poles having magnetic pole ends given substantially with anisotropic property are prepared as shown in FIG. 1A. Then, the prepared magnetic poles are modified to arc-like magnetic poles as shown in FIG. 1B. Thus, the magnetic poles with continuous direction control for anisotropy so that the direction (Mθ) of anisotropy with respect to the radial tangent line of the magnetic pole plane is set to be 90×sin [φ{2π/(360/p)}] can be prepared. FIGS. 1A and 1B show a section of the right side of the magnetic poles, and Hθ shown in FIG. 1A represents an angle between a tangent line of a surface of any magnetic pole piece and a uniform oriented magnetic field (Hex). Hθ corresponds to the direction (Mθ) of anisotropy with respect to a tangent line of a surface of any magnetic pole piece as shown in FIG. 1B.

Figure 2A:
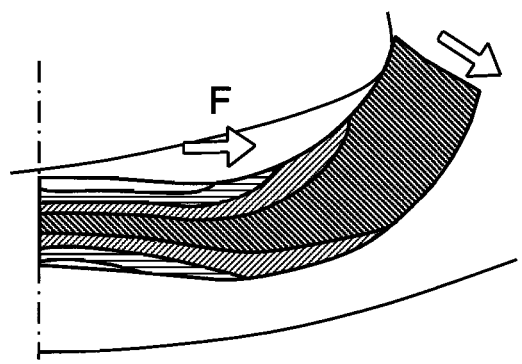
FIG. 2A is a first conceptual view of a modified pattern represented by a stress distribution.
Figure 2B:
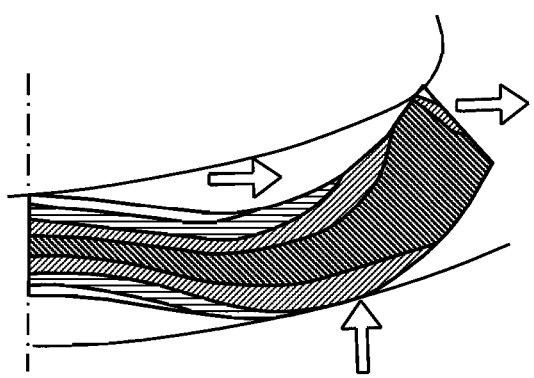
FIG. 2B is a second conceptual view of a modified pattern represented by a stress distribution.
Figure 2C:
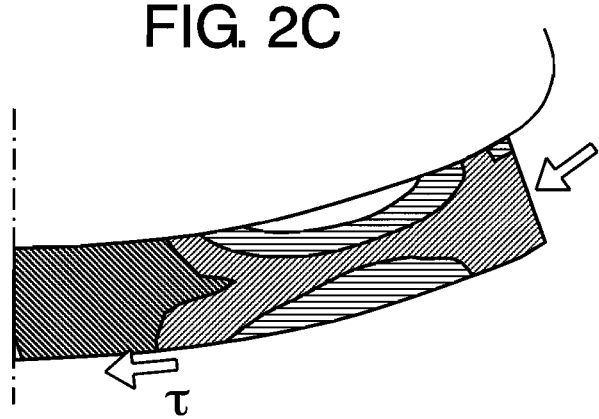
FIG. 2C is a third conceptual view of a modified pattern represented by a stress distribution.

As described above, the present invention provides continuous direction control for anisotropy by modification. In particular, in order that the average absolute value of differences between Mθ and 90×sin [φ{2π/(360/p)}] is set to be 3° or less, assuming that an angle between a uniform oriented magnetic field (Hex) and a radial tangent line of inner and outer circumferences of magnetic poles is Hθ, a circumference length at an airgap side of magnetic poles before modified is Lo, and a circumference length at an airgap side of magnetic poles after modified is L, the magnetic poles are modified by an external force in the radial direction, as shown in FIGS. 2A, 2B and 2C, with a specified range of L0/L≧1.06 to 1.14. At this time, in the step of FIGS. 2A and 2B, first, the modification is ended in circumferential magnetic pole ends and a circumferential magnetic pole center with a relationship of Hθ≈Mθ set in these regions. Subsequently, as shown in FIG. 2C, in portions except the circumferential magnetic pole ends and the circumferential magnetic pole center, Mθ is continuously controlled by means of action of shear stress (τ) toward the circumferential center at the air gap side of magnetic poles. FIGS. 2A, 2B and 2C are conceptual views showing a stress distribution when modified by external force F, where hatching density indicates a degree of stress. τ in FIG. 2C indicates a shear stress related to the present invention and its direction.

For the modification of the magnetic poles, the magnetic poles of the present invention include at least rare-earth magnetic materials and a thermosetting resin composition regulated to modify the magnet poles, as indispensable components, as shown in FIGS. 2A, 2B and 2C. "Modification" mentioned herein means viscosity modification caused by shear flow or expansion flow by an external force F-F' of some of coupling agent component which is uniformly distributed, as thread-like molecular chains entangled by heat, in the magnetic poles, as shown in the conceptual views of FIGS. 3A and 3B.

Figure 3A:
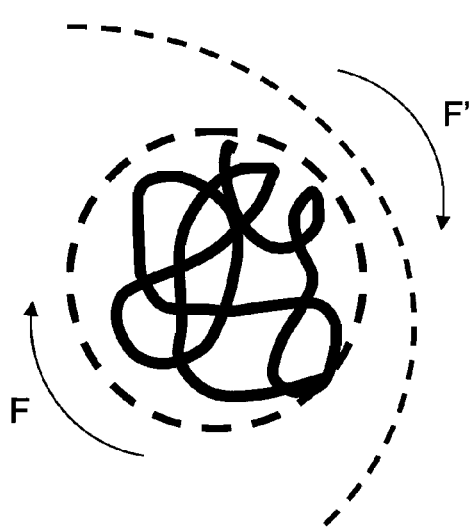
FIG. 3A is a first conceptual view showing a form of flow of molten polymer by an external force.
Figure 3B:
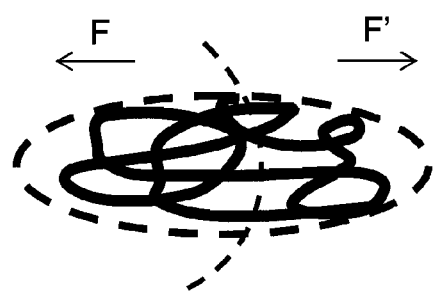
FIG. 3B is a second conceptual view showing a form of flow of molten polymer by an external force.
Figure 4:
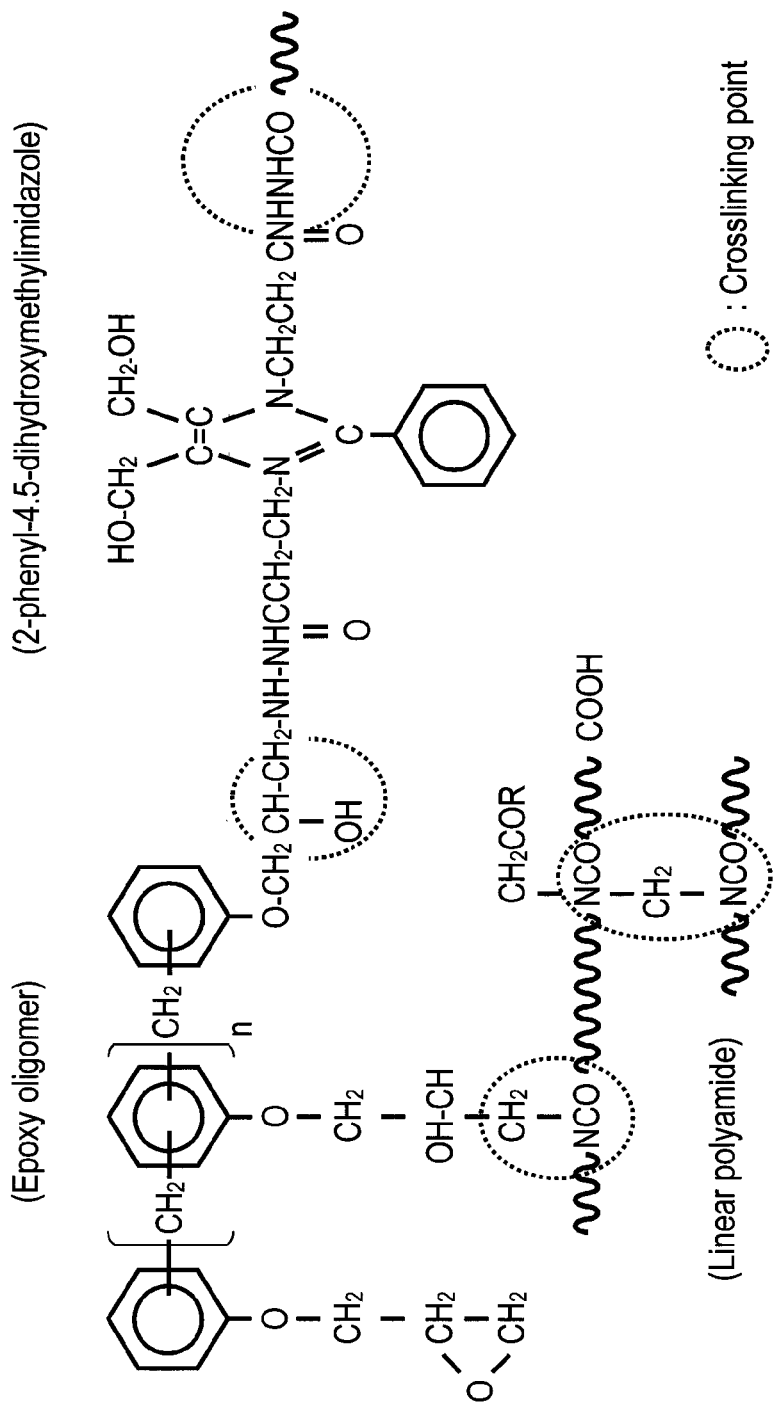
FIG. 4 is a schematic view showing a molecular structure of a thermosetting resin composition responsible for viscosity modification

It is preferable that the modified magnetic poles secure their heat resistance and durability by, for example, structuralizing the coupling agent component, which is shown in FIG. 4, into a three-dimensional net shape by means of a crosslinking reaction. FIG. 4 shows an example of the coupling agent regulated to give modification capability to the magnetic poles related to the present invention, as a thermosetting resin composition including novolak epoxy oligomer, linear polyamide, 2-phenyl-4,5-dihydroxymethylimidazole, etc. In the example of FIG. 4, when uncrosslinked linear polyamide is melted by heat, it is uniformly distributed as entangled thread-like molecular chains in a matrix and is responsible for modification of the magnetic poles by causing shear flow or expansion flow by an external force F-F', as shown in FIGS. 3A and 3B. The thermosetting resin composition causing the flow shown in FIGS. 3A and 3B is not limited to that shown in FIG. 4.

Torque density of a permanent magnet type motor is proportional to airgap magnetic flux density of magnetic poles when a static magnetic field (Ms) produced by the magnetic poles flows, as a magnetic flux ($\phi$), into a stator iron core. Since the airgap magnetic flux density of the motor provided with magnetic poles and a stator iron core having the same dimension and the same structure is approximately proportional to a square root of a ratio of energy density (BH) max of the magnetic poles, if the energy density (BH) max of the magnetic poles related to the present invention is more than 150 kJ/m$^3$, for an isotropic $Nd_2Fe_{14}B$ bonded magnet having the upper limit of energy density (BH) max=80 kJ/m$^3$, it is expected that the airgap magnetic flux density, that is, the torque density, is increased by about 1.36 times. Thus, for increase of the torque density, it is preferable that an anisotropic magnet having the magnetic poles related to the present invention has magnetic performance of residual magnetization (Mr)$\geq$0.95 T, intrinsic coercive force (HcJ)$\geq$0.9 MA/m, and energy density (BH) max$\geq$150 kJ/m$^3$.

To obtain the anisotropic magnetic poles having the energy density (BH) max$\geq$150 kJ/m$^3$, it is preferable that a volume fraction of rare-earth magnetic material having energy density (BH) max$\geq$270 kJ/m$^3$ in the magnetic poles is set to be more than 80 vol. %, and a magnetizing field (Hm) is set to be more than 2.4 MA/m.

Single magnetic domain particle-type 1-5 SmCo-based rare-earth magnet powders and some or all of two-phase separation-type 2-17 SmCo-based rare-earth magnet particles may be used as the rare-earth magnetic material related to the present invention. However, from the viewpoint of resource balance, it is preferable to use rare-earth-iron magnetic material not having Co as a main component. For example, an example of the rare-earth magnetic material related to the present invention may include RD (Reduction and Diffusion)-$Sm_2Fe_{17}N_3$ rare-earth magnet powders of A. Kawamoto et al. (see Non-Patent Document 13), so-called HDDR-$Nd_2Fe_{14}B$-based rare-earth magnet particles produced by hydrogenation ($R_2[Fe, Co]_{14}BH_x$) of a $R_2[Fe, Co]_{14}B$ phase, decomposition ($RH_2$+Fe+$Fe_2B$) at 650 to 1000° C., desorpsion, recombination of rare-earth-iron-based alloys of T. Takeshita et al (see Non-Patent Document 14).

In addition, when the magnetic poles contain a composite of the rare-earth-iron-based magnetic materials, both of Sm and Nd can be used in balance. In particular, when the magnetic poles have a macro structure in which polycrystalline-typed $Nd_2Fe_{14}B$-based rare-earth magnet particles are isolated from each other in a matrix (continuous phase) including $Sm_2Fe_{17}N_3$-based rare-earth magnet powders having average particle diameter of 3 to 5 µm and a coupling agent, it is possible to suppress deterioration of magnetic performance due to generation and oxidation of new surfaces caused by damage or breakage of $Nd_2Fe_{14}B$-based rare-earth magnet particle surfaces in molding work. Alternatively, since the volume fraction of the magnetic material having energy density (BH) max$\geq$270 kJ/m$^3$ in the magnetic poles can be set to be more than 80 vol. % with the magnetizing field (Hm) set to be more than 2.4 MA/m in parallel to an oriented magnetic field (Hex), it is ease to obtain magnetic poles having energy density (BH) max$\geq$150 kJ/m$^3$ (see Non-Patent Document 15).

Embodiment

Hereinafter, according to an embodiment of the present invention, magnetic poles having continuously-controlled anisotropy, an 8-pole permanent magnet rotator, and a 8-pole/12-slot permanent magnet type motor will be described in more detail. However, the present invention is not limited to this embodiment.

In this embodiment, material composition of a magnet includes anisotropic $Sm_2Fe_{17}N_3$-based rare-earth magnet powders of 32.1 vol. % having energy density (BH) max=290 kJ/m$^3$ and particle diameter of 3 to 5 µm, anisotropic $Nd_2Fe_{14}B$-based rare-earth magnet particles of 48.9 vol. % having energy density (BH) max=270 kJ/m$^3$ and particle diameter of 38 to 150 µm, novolak epoxy oligomer of 6.2 vol. %, linear polyamide of 9.1 vol. %, 2-phenyl-4,5-dihydroxymethylimidazole of 1.8 vol. %, and a lubricant (pentaerytritol stearic acid triester) of 1.9 vol. %.

Figure 5:
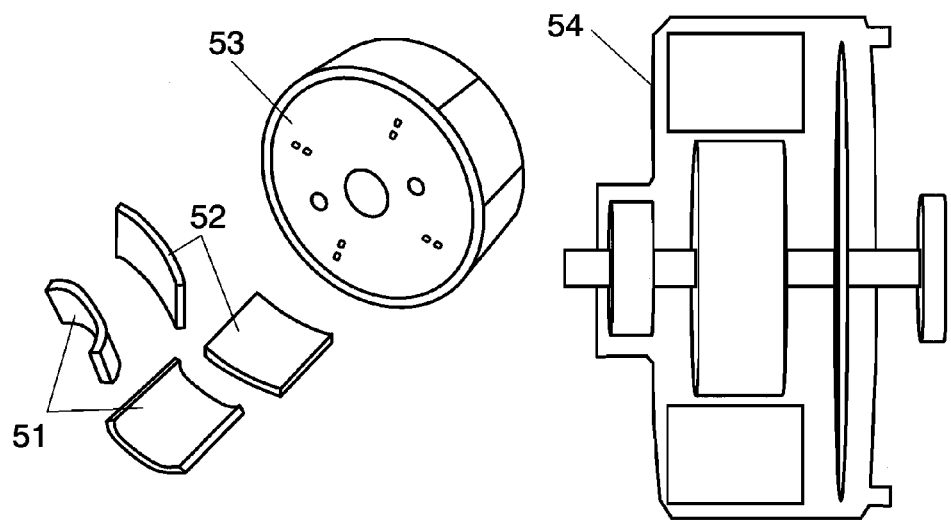
FIG. 5 is a perspective view of magnetic poles, a permanent magnet rotator and a permanent magnet type motor.

First, as shown in FIG. 5, magnetic pole 51 before modified with 50 MPa of a uniform oriented magnetic field Hex of 1.4 MA/m is prepared. Next, magnetic pole 52 is prepared by modifying magnetic pole 51 into an arc shape having outer radius of 20.45 mm and thickness of 1.5 mm using viscosity modification of molted linear polyamide. In this case, the modification is carried out under conditions of 135° C., 2 MPa, no uniform oriented magnetic field (Hex) and no sustain time.

Magnetic pole 52 is solidified by crosslinking with a coupling agent by means of annealing at 170° C. for 20 minutes in the air and then is pulse-magnetized with Hm=2.4 MA/m in parallel to Hex. By adhering the resultant magnetic pole 52 to the circumference of a laminated electromagnetic steel sheet having outer diameter of 37.9 mm, 8-pole permanent magnet rotator 53 having outer diameter of 40.9 mm and length of 14.5 mm is made. Then, 8-pole/12-slot permanent magnet type motor 54 is made using this 8-pole permanent magnet rotator 53.

Figure 6:
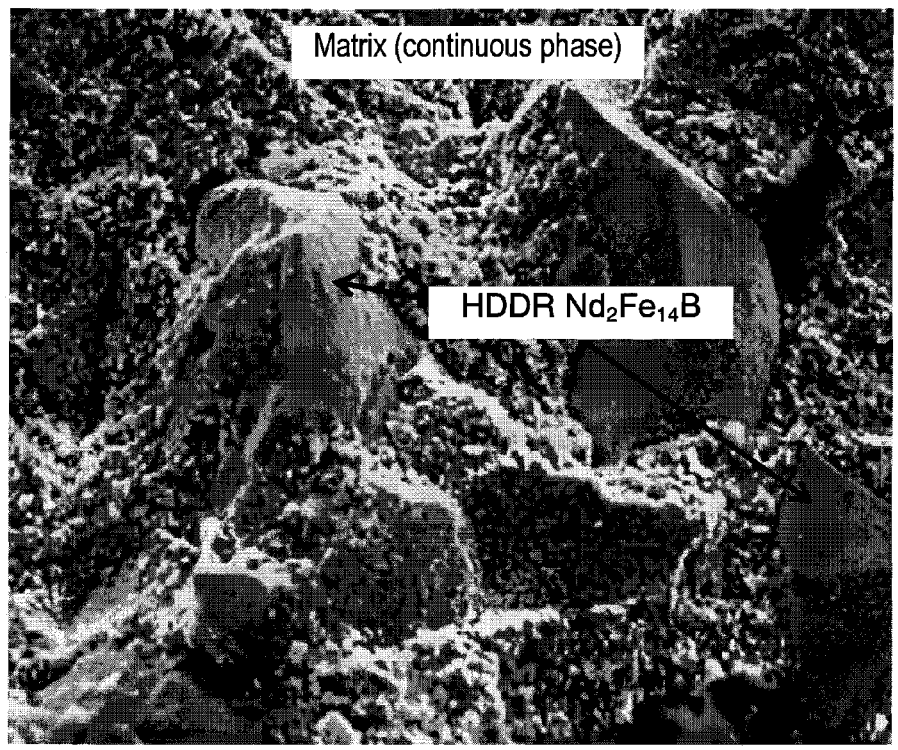
FIG. 6 is an electron microscopic photograph showing a macro-structure of magnetic poles.

FIG. 6 is a scan electron microscopic photograph showing a macro structure of magnetic poles having density of 6.01 Mg/m$^3$ related to the present invention. The macro structure of the magnetic poles has a structure in which $Nd_2Fe_{14}B$-based rare-earth magnet particles are isolated from each other in a matrix (continuous phase) including $Sm_2Fe_{17}N_3$-based rare-earth magnet powders and a coupling agent. With this structure, a volume fraction of $Sm_2Fe_{17}N_3$-based and $Nd_2Fe_{14}B$-based rare-earth magnetic materials in the magnetic poles is set to be 81 vol. %.

A volume fraction of magnetic material in an isotropic $Nd_2Fe_{14}B$-based bonded magnet is generally 80 vol. % or so (density of 6 Mg/m$^3$) even if the magnetic material is broken, compressed and densified with 0.8 to 1.0 GPa. However, in this embodiment, the volume fraction of rare-earth magnetic material in the magnetic poles is 81 vol. % (density of 6.1 Mg/m$^3$) with compression of only 50 MPa, and no crack and breakage are observed in the $Nd_2Fe_{14}B$-based rare-earth magnet particles formed as shown FIG. 6.

In this embodiment, the coupling agent used for the magnetic poles before modified is a thermosetting resin composition including novolak epoxy oligomer having epoxy equivalent weight of 205 to 220 g/eq and melting point of 70 to 76° C., linear polyamide having melting point of 80° C. and molecular weight of 4000 to 12000, and 2-phenyl-4,5-dihydroxymethylimidazole, as can be seen from the conceptual view showing the molecular structure shown in FIG. 4. These compositions are not gelled in forming work and are distributed as entangled thread-like molecule chains in the magnetic poles, with the linear polyamide re-melted by heat. Then, the magnetic poles are modified like magnetic poles 52 of FIG. 5 by the external force as shown in FIGS. 2A, 2B and 2C.

Next, magnetic pole 52 after modified into an arc shape related to the present invention is annealed at 170° C. for 20 minutes in the air. Thus, the thermosetting resin composition including linear polyamide is crosslinked and densified as shown in FIG. 4. FIG. 4 represents a free epoxy group which can react with imidazoles, a terminal carboxyl group of linear polyamide, etc.

Figure 7:
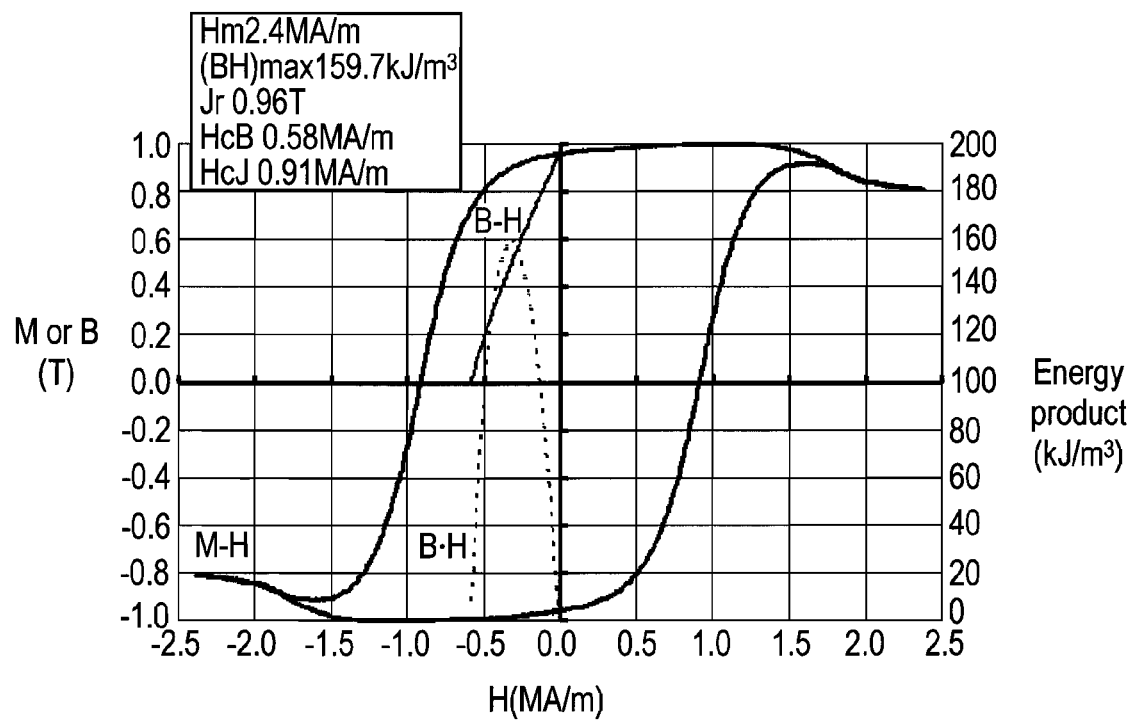
FIG. 7 is a characteristic diagram showing magnetic performance of magnetic poles.

FIG. 7 is a characteristic diagram showing a M-H curve of the magnetic poles according to the embodiment. As shown in FIG. 7, when the magnetic poles are pulse-magnetized with a uniform magnetizing field (Hm) of 2.4 MA/m in parallel to a uniform oriented magnetic field (Hex), the energy density (BH) max reaches 159 kJ/m$^3$ which is about double as large as energy density (BH) max$\geq$80 kJ/m$^3$ of a general isotropic Nd$_2$Fe$_{14}$B bonded magnet in applications including small motors having power capacity of 50 W or less.

Magnetic pole 52 related to this embodiment shown in FIG. 5 has outer radius of 20.45 mm, inner radius of 18.95 mm, thickness of 1.5 mm and weight of 2 g and is pulse-magnetized with a uniform magnetizing field (Hm) of 2.4 MA/m in parallel to a uniform oriented magnetic field (Hex) using a solenoid coil and a pulse magnetization power source. Then, by adhering 8 magnetic poles to the circumference of a laminated electromagnetic steel sheet having outer diameter of 37.9 mm, 8-pole permanent magnet rotator 53 of this embodiment having outer diameter of 40.9 mm and axial length of 14.5 mm is made as shown in FIG. 5. Then, 8-pole/12-slot permanent magnet type motor 54 is made using this 8-pole permanent magnet rotator 53, as shown in FIG. 5.

In addition, an arc-like magnetic pole having outer radius of 20.45 mm, inner radius of 18.95 mm and thickness of 1.5 mm is directly prepared in a space of a uniform oriented magnetic field (Hex), and a 8-pole permanent magnet rotator having outer diameter of 40.9 mm and axial length of 14.5 mm is prepared as Conventional Example 1 using the prepared magnetic pole.

In addition, like the present invention, by adhering a ring-shaped 80 kJ/m$^3$ isotropic magnet of which weight is 16 g to the circumference of a laminated electromagnetic steel sheet having outer diameter of 37.9 mm, an 8-pole permanent magnet rotator having diameter of 40.9 mm and axial length of 14.5 mm and sinusoidal wave-magnetized using a magnetizing yoke and a pulse magnetization power source is prepared as Conventional Example 2.

Figure 8:
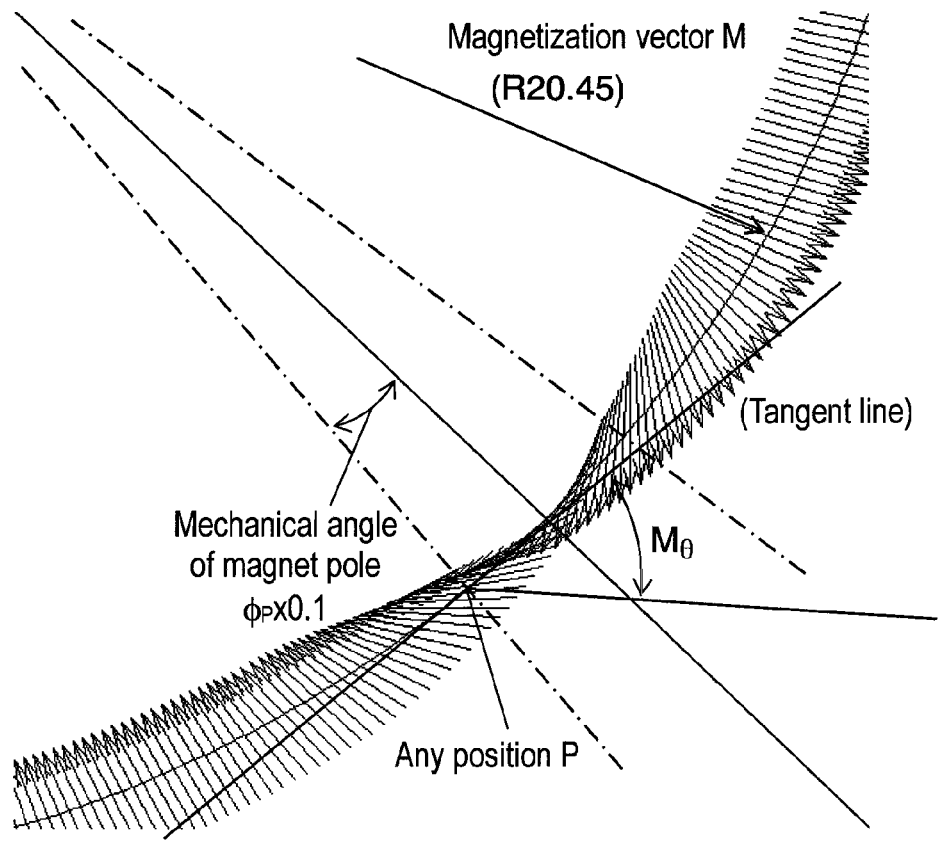
FIG. 8 is a characteristic diagram showing a relationship between a mechanical angle (φ) and a direction of a static magnetic field (Ms).

FIG. 8 is a characteristic diagram showing a direction of a static magnetic field (Ms) indicated by an arrow on the circumference of the radial magnetic pole center of a 8-pole magnet rotator of an embodiment prepared from a magnetic pole having energy density (BH) max=159 kJ/m$^3$ related to the present invention. Where, a mechanical angle $\phi$ of the magnetic pole is 45° and the static magnetic field (Ms) is indicated by a 0.5° pitch.

The magnetic pole related to this embodiment is magnetized with a uniform magnetizing field (Hm) of 2.4 MA/m in parallel to a uniform oriented magnetic field (Hex). When the magnetic pole is magnetized with 2.4 MA/m and 4 MA/m, residual magnetization (Mr) of the magnetic pole is 0.96 T and a coercive force (HcJ) is 0.9 MA/m. From this, when Hm is at least 2.4 MA/m, the magnetic pole can be regarded to be nearly completely magnetized.

In addition, although the direction of the uniform magnetizing field (Hm) is deviated from the direction (M$\theta$) (magnetization easy axis direction) of anisotropy, the magnetically anisotropic magnetic pole related to this embodiment may be regarded to be magnetized along the direction (M$\theta$) of anisotropy. Accordingly, in FIG. 8, the angle (M$\theta$) between the static magnetic field (Ms) and a radial tangent line of the magnetic pole means a direction of anisotropy.

Figure 9:
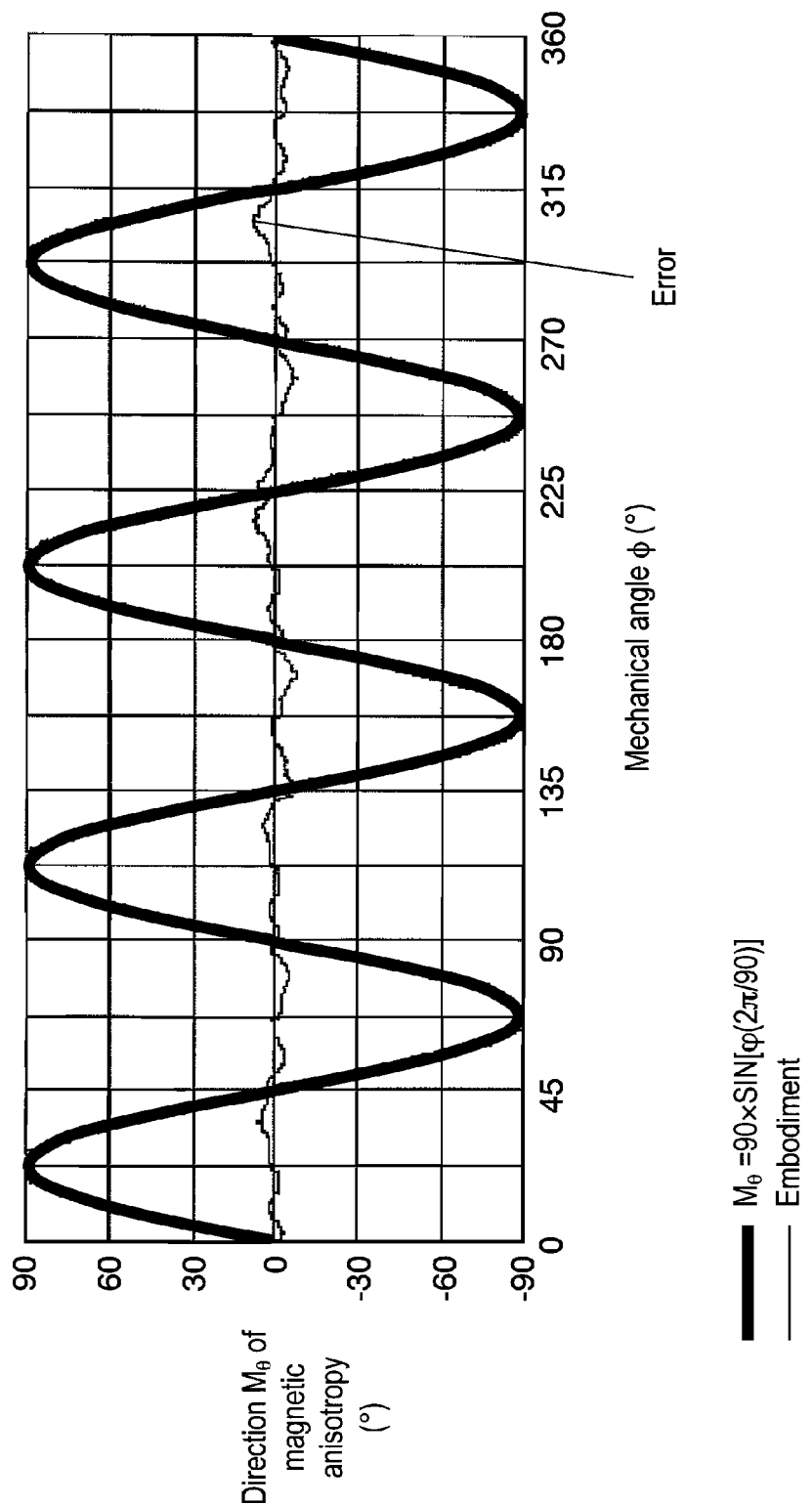
FIG. 9 is a characteristic diagram showing a relationship between a mechanical angle (φ) and an anisotropy direction Mθ.

FIG. 9 is a characteristic diagram showing a relationship between a mechanical angle ($\phi$) of a 8-pole permanent magnet rotator and a direction (M$\theta$) of anisotropy and a relationship between the mechanical angle ($\phi$) and 90×sin [$\phi\{2\pi/(360/p)\}$] when a circumference length Lo at an airgap side of the magnetic pole of the embodiment before modified is 17.55 mm, a circumference length L at an airgap side of the magnetic pole of the embodiment after modified is 16.06 mm, and thus Lo/L$\geq$1.09. Here, since p represents the number of pole pairs (4 in this embodiment), FIG. 9 shows a sinusoidal curve of 90×sin [$\phi\{2\pi/(90)\}$]. A characteristic curve representing an error in FIG. 9 represents a difference between 90×sin [$\phi\{2\pi/(90)\}$] and M$\theta$ with respect to the mechanical angle ($\phi$). As apparent from FIG. 9, the direction (M$\theta$) of anisotropy related to this embodiment nearly coincides with the sinusoidal curve with respect to the mechanical angle ($\phi$), and the average absolute value of differences therebetween is 2.42° (the number of measurement points n=9019). That is, by modifying the magnetic poles so that the average absolute value of differences between M$\theta$ and 90×sin [$\phi\{2\pi/(360/p)\}$] is 3° or less, it is possible to obtain a permanent magnet rotator with precise continuous direction control for anisotropy.

Figure 10:
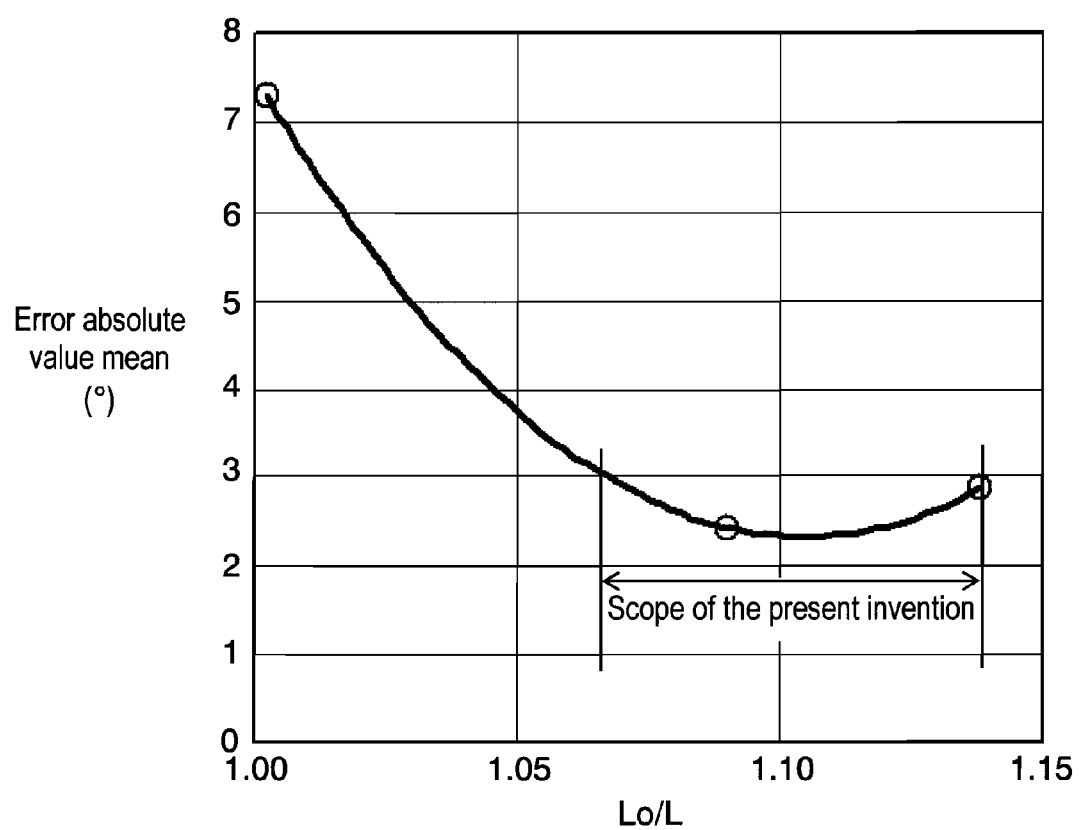
FIG. 10 is a characteristic diagram showing a relationship between circumference length (Lo/L) and precision of continuous direction control of anisotropy.
Figure 11A:
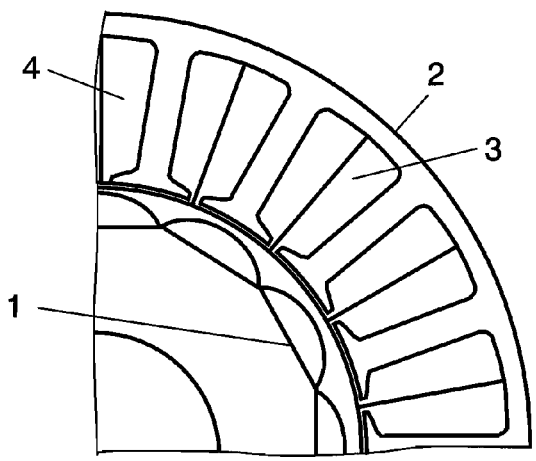
FIG. 11A is a first conceptual view showing a cogging torque reduction method by a conventional magnet shape.
Figure 11B:
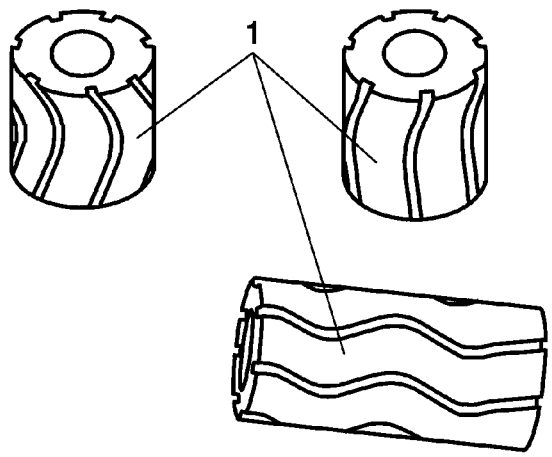
FIG. 11B is a second conceptual view showing a cogging torque reduction method by a conventional magnet shape.
Figure 11C:
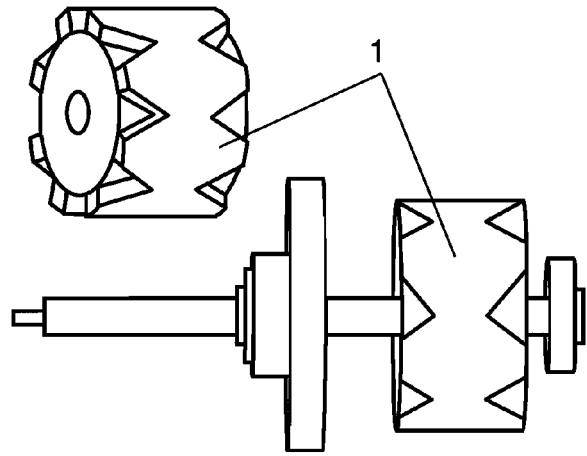
FIG. 11C is a third conceptual view showing a cogging torque reduction method by a conventional magnet shape.
Figure 12A:
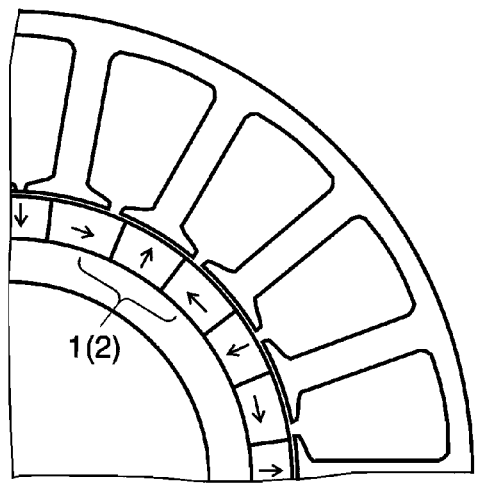
FIG. 12A is a first conceptual view showing a cogging torque reduction method by conventional magnetization direction discontinuous control.
Figure 12B:
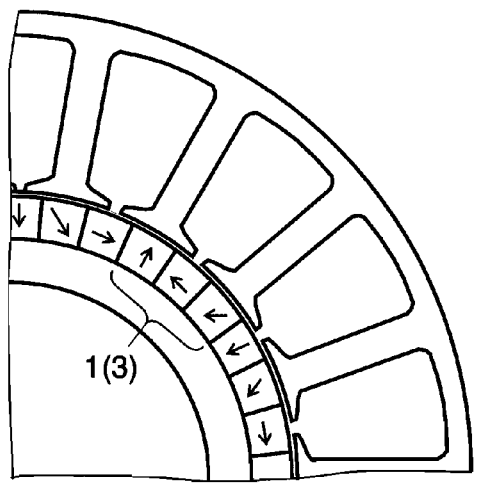
FIG. 12B is a second conceptual view showing a cogging torque reduction method by conventional magnetization direction discontinuous control.
Figure 12C:
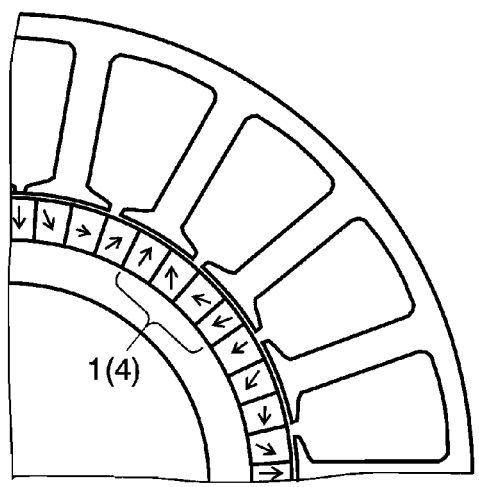
FIG. 12C is a third conceptual view showing a cogging torque reduction method by conventional magnetization direction discontinuous control.
Figure 12D:
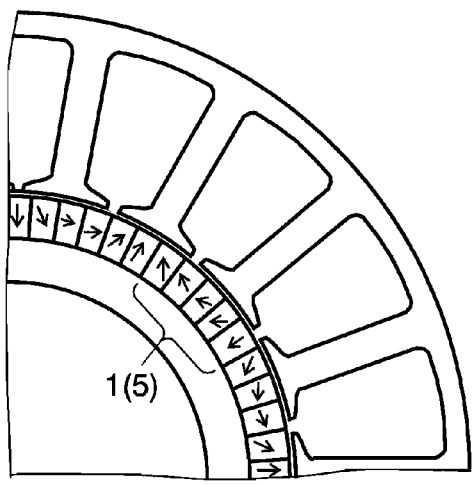
FIG. 12D is a fourth conceptual view showing a cogging torque reduction method by conventional magnetization direction discontinuous control.
Figure 13:
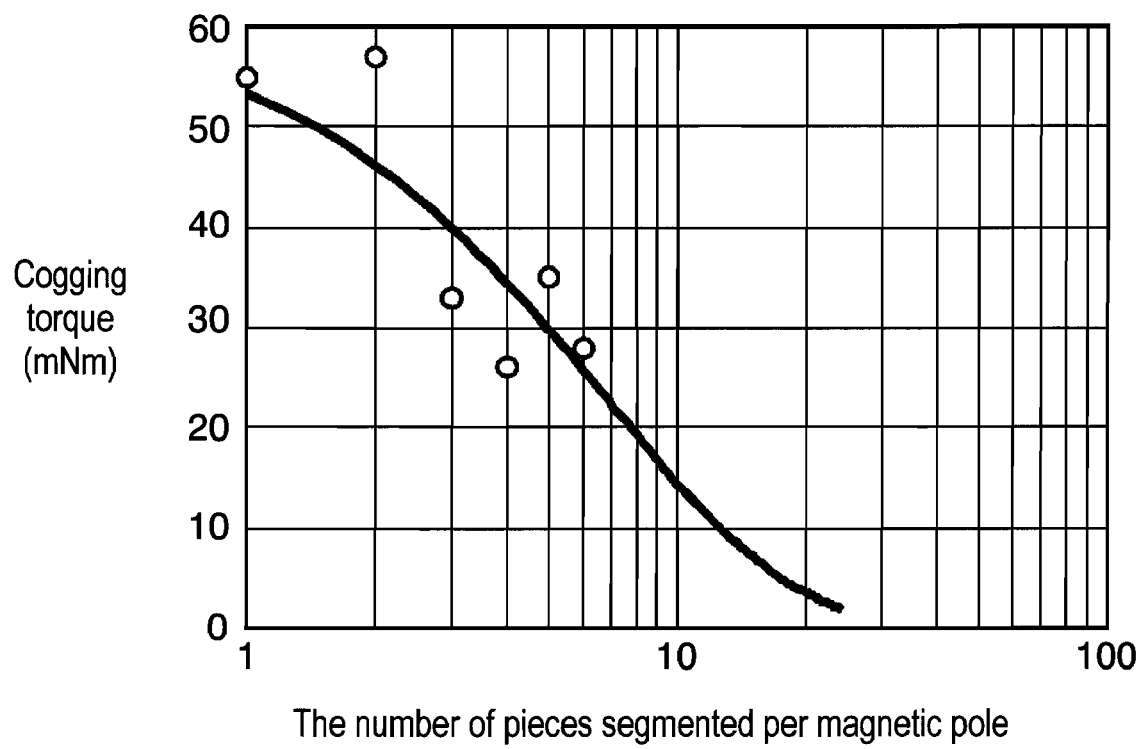
FIG. 13 is a characteristic diagram showing a relationship between the number of conventional magnetic pole pieces having different magnetization directions and cogging torque.
Figure 14:
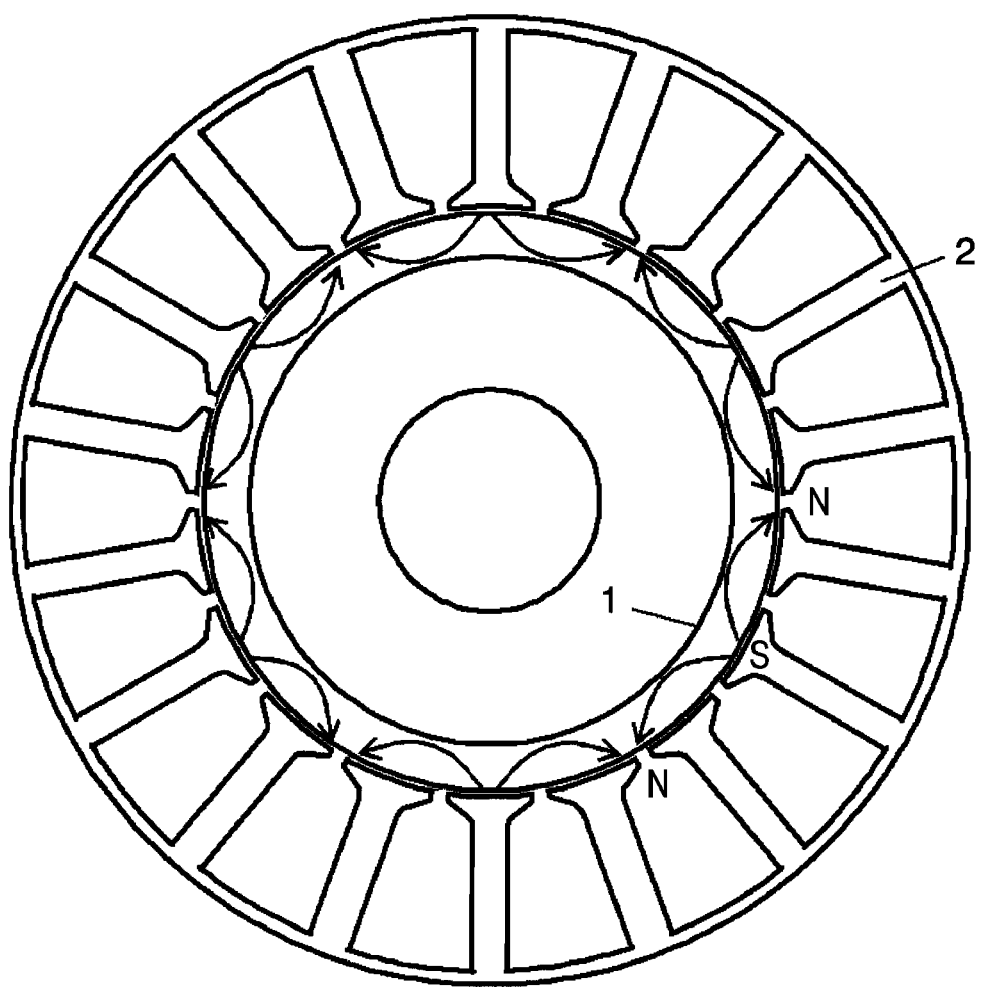
FIG. 14 is a conceptual view showing a magnetization pattern of a conventional isotropic magnet.

FIG. 10 is a characteristic diagram showing a relationship between Lo/L and the average absolute value of differences between M$\theta$ and 90×sin [$\phi\{2\pi/(90)\}$] when Lo represents a circumference length at an airgap side of the magnetic pole of the embodiment before modified and L represents a circumference length L at an airgap side of the magnetic pole of the embodiment after modified. As can be seen from FIG. 10, the average absolute value of differences between M$\theta$ and 90×sin [$\phi\{2\pi/(90)\}$] depends greatly on Lo/L and is set to a range of 1.06 to 1.14. Then, when the magnetic pole is modified in its radial direction by the external force shown in FIGS. 2A, 2B and 2C, in the step of FIGS. 2A and 2B, first, the modification is ended in circumferential magnetic pole ends and a circumferential magnetic pole center with a relationship of H$\theta$≈M$\theta$ set in these regions. Subsequently, in the final step as shown in FIG. 2C, in portions except the circumferential magnetic pole ends and the circumferential magnetic pole center, since M$\theta$ can be continuously controlled by means of action of shear stress ($\tau$) toward the circumferential center at the air gap side of magnetic pole, the average absolute value of differences between M$\theta$ and 90×sin [$\phi\{2\pi/(90)\}$] can be set to be 3° or less.

If Lo/L is less than 1.06, M$\theta$ can not be precisely continuously controlled due to insufficient shear stress ($\tau$). If Lo/L is more than 1.14, a distribution of M$\theta$ with respect to the mechanical angle ($\phi$) is scattered by excessive action of shear stress ($\tau$). The average absolute value of differences between M$\theta$ and 90×sin [$\phi\{2\pi/(90)\}$] is 8.41° in Conventional Example 1 and is 1.88° in Conventional Example 2 in which the ring-shaped isotropic magnet is sinusoidal wave-magnetized. In consideration of assembly precision when an arc-like isotropic magnet is adhered to a laminated electromagnetic steel sheet, the average absolute value in the present invention is substantially the same as Conventional Example 2.

An induced voltage and a cogging torque which are proportional to the torque density of the permanent magnet type motor related to this embodiment are 24.1 V and 3 mNm, respectively. The induced voltage and the cogging torque are 25.1 V and 6 mNm, respectively, in Conventional Example 1 (159 kJ/m³) and are 18 V and 3.8 mNm, respectively, in Conventional Example 2 (80 kJ/m³).

As apparent from the above description, Embodiment 1 of the present invention has decrease by 4% in torque density and decrease by 50% in cogging density as compared to Conventional Example 1 and increase by 134% in torque density and decrease by 21% in cogging density as compared to Conventional Example 2 (80 kJ/m³).

In conclusion, according to the present invention, it is possible to increase torque density of a motor while suppressing increase of cogging torque of the motor with increase of energy density (BH) max. Accordingly, it is possible to achieve reduction of power consumption, savings in resources, miniaturization and quiescence of motors.

INDUSTRIAL APPLICABILITY

The present invention relates to a permanent magnet rotator which is capable of providing continuous direction control for anisotropy with modification of a magnetic pole so that direction M$\theta$ of anisotropy with respect to a mechanical angle $\phi$ can have a distribution of 90×sin [$\phi$\{2$\pi$/(360/p)\}], and a motor using the same. More particularly, the present invention relates to a permanent magnet rotator which is capable of providing continuous direction control for anisotropy for the purpose of reduction of power consumption, savings in resources, miniaturization and quiescence of permanent magnet type motors having their power capacity of about 50 W or less which are being widely used as various kinds of driving sources for home appliances, air conditioners, information devices, etc, and a motor using the same, and has high industrial applicability.

The invention claimed is:

1. A permanent magnet rotator which is adapted to provide continuous direction control for anisotropy with modification of magnetic poles so that the average absolute value of differences between M$\theta$ and 90×sin [$\phi$\{2$\pi$/(360/p)\}] is set to be 3° or less, where M$\theta$ is an angle of magnetization vector (M) with respect to a radial tangent line of a magnetic pole plane, $\phi$ is a mechanical angle, and p is the number of pole pairs.

2. The permanent magnet rotator of claim 1,
wherein, assuming that an angle of a uniform oriented magnetic field (Hex) with respect to a radial tangent line of inner and outer circumferences of the magnetic poles is H$\theta$, a circumference length at an airgap side of the magnetic poles before modified is Lo, and a circumference length at an airgap side of the magnetic poles after modified is L,
the magnetic poles are modified in a radial direction with a range of Lo/L=1.06 to 1.14 so that H$\theta$ in circumferential magnetic pole ends and a circumferential magnetic pole center becomes equal to a direction of anisotropy and, in portions except the circumferential magnetic pole ends and the circumferential magnetic pole center, continuous direction control is provided for anisotropy by means of action of shear stress ($\tau$) toward the circumferential center at the air gap side of the magnetic poles.

3. The permanent magnet rotator of claim 1,
wherein continuous direction control is provided for anisotropy using viscosity modification caused by shear flow, expansion flow and a combination thereof of linear melted polymer, which are caused by an external force.

4. The permanent magnet rotator of claim 1,
wherein the magnetic poles have magnetic performance of residual magnetization (Mr)≧0.95 T, intrinsic coercive force (HcJ)≧0.9 MA/m, and energy density (BH) max≧150 kJ/m³.

5. The permanent magnet rotator of claim 1,
wherein the magnetic poles have a macro structure in which $Nd_2Fe_{14}B$-based rare-earth magnet particles having size of 150 μm or less are isolated from each other in a matrix (continuous phase) including $Sm_2Fe_{17}N_3$-based rare-earth magnet powders having average particle diameter of 3 to 5 μm and a coupling agent.

6. The permanent magnet rotator of claim 1,
wherein a volume fraction of magnetic material having energy density (BH) max of more than 270 kJ/m³ in the magnetic poles is set to be more than 80 vol. %, a magnetizing field (Hm) is set in parallel to an oriented magnetic field (Hex), and the magnetizing field (Hm) is set to be 2.4 MA/m or more.

7. A motor using a permanent magnet rotator of claim 1.

8. A motor using a permanent magnet rotator of claim 5.

9. A motor using a permanent magnet rotator of claim 6.

10. The permanent magnet rotator of claim 2,
wherein the magnetic poles have a macro structure in which $Nd_2Fe_{14}B$-based rare-earth magnet particles having size of 150 μm or less are isolated from each other in a matrix (continuous phase) including $Sm_2Fe_{17}N_3$-based rare-earth magnet powders having average particle diameter of 3 to 5 μm and a coupling agent.

11. The permanent magnet rotator of claim 3,
wherein the magnetic poles have a macro structure in which $Nd_2Fe_{14}B$-based rare-earth magnet particles having size of 150 μm or less are isolated from each other in a matrix (continuous phase) including $Sm_2Fe_{17}N_3$-based rare-earth magnet powders having average particle diameter of 3 to 5 μm and a coupling agent.

12. The permanent magnet rotator of claim 4,
wherein the magnetic poles have a macro structure in which $Nd_2Fe_{14}B$-based rare-earth magnet particles having size of 150 μm or less are isolated from each other in a matrix (continuous phase) including $Sm_2Fe_{17}N_3$-based rare-earth magnet powders having average particle diameter of 3 to 5 μm and a coupling agent.

13. The permanent magnet rotator of claim 2,
wherein a volume fraction of magnetic material having energy density (BH) max of more than 270 kJ/m³ in the magnetic poles is set to be more than 80 vol. %, a magnetizing field (Hm) is set in parallel to an oriented magnetic field (Hex), and the magnetizing field (Hm) is set to be 2.4 MA/m or more.

14. The permanent magnet rotator of claim 3,
wherein a volume fraction of magnetic material having energy density (BH) max of more than 270 kJ/m³ in the magnetic poles is set to be more than 80 vol. %, a magnetizing field (Hm) is set in parallel to an oriented magnetic field (Hex), and the magnetizing field (Hm) is set to be 2.4 MA/m or more.

15. The permanent magnet rotator of claim 4,
wherein a volume fraction of magnetic material having energy density (BH) max of more than 270 kJ/m³ in the magnetic poles is set to be more than 80 vol. %, a magnetizing field (Hm) is set in parallel to an oriented magnetic field (Hex), and the magnetizing field (Hm) is set to be 2.4 MA/m or more.

16. A motor using a permanent magnet rotator of claim 2.
17. A motor using a permanent magnet rotator of claim 3.
18. A motor using a permanent magnet rotator of claim 4.

* * * * *